J. L. MESSER.
Lime-Kilns.

No. 142,805. Patented September 16, 1873.

Witnesses:
Charles Kilfoile
Austin F. Park

Inventor:
John L. Messer

UNITED STATES PATENT OFFICE.

JOHN L. MESSER, OF TROY, NEW YORK.

IMPROVEMENT IN LIMEKILNS.

Specification forming part of Letters Patent No. 142,805, dated September 16, 1873; application filed August 12, 1873.

To whom it may concern:

Be it known that I, JOHN L. MESSER, of the city of Troy, in the county of Rensselaer and State of New York, have invented certain Improvements in Limekilns, of which the following is a specification, reference being had to the accompanying drawing.

The distinguishing feature of my invention is a removable furnace having an open, perforated, or grated top arranged under and in combination with the discharge-passage in the bottom of a limekiln, so that the flame and heated gases of combustion shall pass from the said furnace through its open, perforated, or grated top directly into the bottom of the kiln and upward through the limestone, or limestone and burning fuel therein, and thereby cause or increase and equalize the heating and burning of the limestone throughout all parts of the kiln, and insure the very even and complete calcination of the lime, and with less fuel than would be required in the same kiln without the said removable furnace, and so that the said furnace can be readily removed to permit the discharge of the burnt lime through the said discharge-passage in the bottom of the kiln, and can be quickly replaced under and against the said discharge-passage upon removing the discharged lime.

Figure 1:
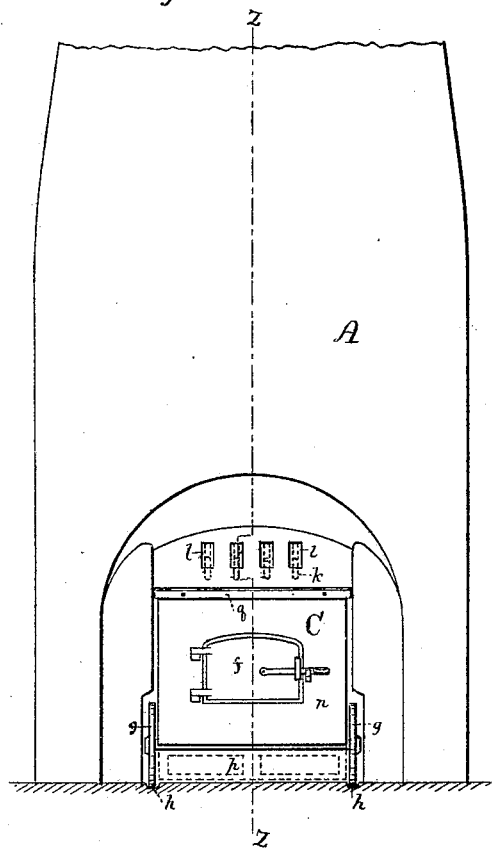
Figure 2:
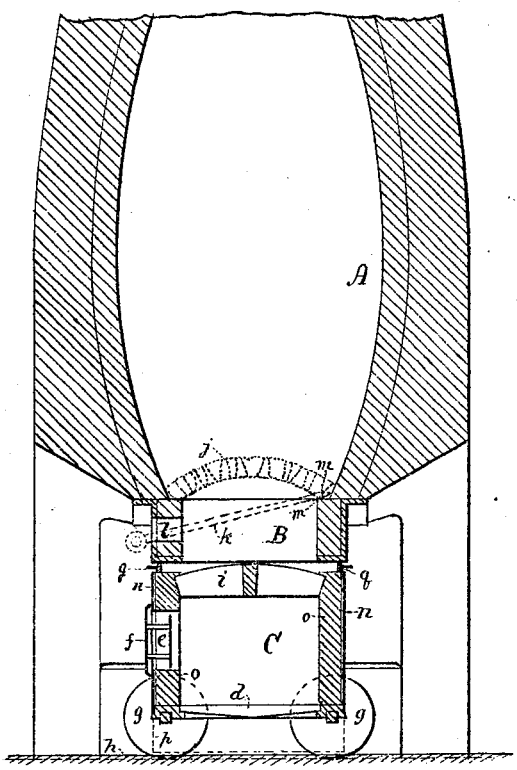
Figure 3:
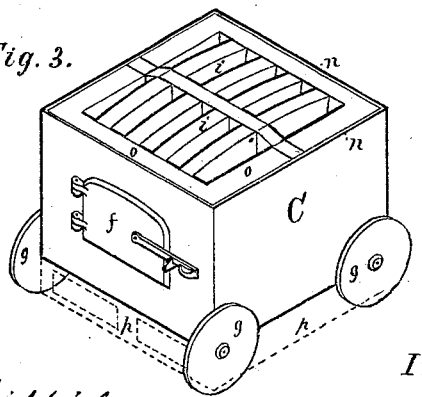

In the aforesaid drawing, Figure 1 is a side elevation, and Fig. 2 a vertical section at the line $z\ z$ in Fig. 1, of a limekiln having a removable furnace combined therewith, according to my invention; and Fig. 3 is an isometrical drawing of the removable furnace, which is combined with the limekiln in Figs. 1 and 2.

Like parts are marked by like letters in the different figures.

A is the limekiln, and B is the discharge-passage in its bottom. C is a removable furnace having a grate, $d$, to support burning fuel therein, and an aperture, $e$, furnished with a door, $f$, through which the fuel can be put into the furnace. The furnace is mounted on wheels $g$, which rest on a bed or track, $h\ h$, upon which the furnace can be withdrawn from and returned under the discharge-passage of the kiln. In the top of the furnace is a grate, $i$, which is formed of fire-brick, or other suitable refractory material, and which will prevent the limestones from falling into the furnace, while it will permit the flame and gases of combustion to pass from the furnace up into the kiln.

When the kiln is used as a "set" kiln, and the limestone therein is burned from the bottom to the top of the kiln without discharging any lime therefrom until the whole is completely calcined and is all discharged at one operation, I sometimes form a temporary arch of the stone, as indicated by dotted lines at $j$ in Fig. 2, with holes through it for the passage of air, and the flame and gases of combustion from the furnace C. In such cases the arch will support the limestone above it, and will prevent lumps of lime from falling into the furnace, and the top of the furnace may be entirely open, and need not have a perforated crown nor a grate therein.

When the kiln is used as a "draw" kiln or "perpetual" kiln it is important that the removable furnace should have a perforated or grated top, for it is then desirable to have the lime in the kiln rest on the top of the furnace. To draw lime from the kiln in such cases I generally first insert suitable iron rods, indicated by dotted lines at $k$, through apertures $l$ in one side of the passage B, and across the latter until the inner ends of the rods rest on a seat, $m$, at the opposite side. Then the furnace C is drawn from under the kiln, and the rods $k$ are next drawn out of the passage B, and the lime falls from the lower part of the kiln into the space below the discharge-passage or into a car placed therein to receive the lime. Then the rods $k$ are re-inserted through the lime in the passage B, as indicated in Fig. 2, and the discharged lime is removed, and thereupon the furnace is replaced under the discharge-passage B, and the rods $k$ are then withdrawn and let the limestone in the kiln rest on or be supported by the grated or perforated top $i$ of the furnace.

When using the removable furnace, in combination with the limekiln, as above described, the heat for calcining the lime in the kiln can be derived either wholly from the combustion of fuel in the furnace, or partly from the combustion of fuel in the furnace, and partly from the combustion of coal or other suitable fuel introduced into the kiln in thin layers, alternately with thick layers of the limestone. In either case the lime can be calcined more evenly and better, or with less fuel than when the heat in the same kiln is derived wholly from the combustion of fuel in layers alternating with layers of the limestone in the kiln, as usual.

The furnace C may have an iron casing, $n$, lined with fire-brick $o$, or may be otherwise suitably constructed; and the draft through its grate $d$ may, if desired, be regulated by having under it a close ash-pit, indicated by dotted lines at $p$, with dampered apertures therein. Dampers $q$ may be used to close and open narrow spaces between the top of the furnace and the bottom of the rim of the discharge-passage. The furnace C may be mounted on wheels $g$ upon a bed or track, $h$, or on a bed or rows of rollers, or otherwise, so that the furnace can be readily removed from and replaced under the discharge-passage in the bottom of the kiln.

My invention above described is generally applicable to the most common kind of lime-kilns in ordinary use, and when applied to such kilns will generally increase the value of the product thereof in respect to the cost of producing such product, and at the same time the kiln will be left in proper condition for use in the ordinary manner whenever the furnace shall be temporarily removed for repairs.

What I claim as my invention, and desire to secure by Letters Patent, is—

A removable furnace having an open, perforated, or grated top, arranged under and in combination with the discharge-passage in the bottom of a lime-kiln, substantially as herein described.

In testimony whereof I hereunto subscribe my name this 22d day of July, 1873.

JOHN L. MESSER.

Witnesses:
CHARLES KILFOILE,
AUSTIN F. PARK.